(12) United States Patent
Lee et al.

(10) Patent No.: US 8,467,809 B2
(45) Date of Patent: Jun. 18, 2013

(54) METHOD AND APPARATUS FOR ESTIMATING CELLULAR TOWER LOCATION

(75) Inventors: Minan Miin-Nan Lee, Tempe, AZ (US);
Susan S. Chen, Chandler, AZ (US);
Kungwel Liu, Chandler, AZ (US);
Merlin J. Smith, Chandler, AZ (US);
Subhash Uppalapati, Tempe, AZ (US);
Chetan V. Kale, Chandler, AZ (US)

(73) Assignee: Garmin Switzerland GmbH (CH)

( * ) Notice: Subject to any disclaimer, the term of this patent is extended or adjusted under 35 U.S.C. 154(b) by 416 days.

(21) Appl. No.: 12/710,653

(22) Filed: Feb. 23, 2010

(65) Prior Publication Data

US 2011/0207455 A1 Aug. 25, 2011

(51) Int. Cl.
*H04W 24/00* (2009.01)
(52) U.S. Cl.
USPC .............. 455/456.5; 455/456.1; 455/456.6
(58) Field of Classification Search
USPC .................. 455/272, 269, 434, 456.1
See application file for complete search history.

(56) References Cited

U.S. PATENT DOCUMENTS

| | | | |
|---|---|---|---|
| 6,606,494 B1 * | 8/2003 | Arpee et al. | 455/422.1 |
| 7,620,029 B2 * | 11/2009 | Rick et al. | 370/344 |
| 2006/0030333 A1 * | 2/2006 | Ward et al. | 455/456.1 |
| 2007/0275717 A1 * | 11/2007 | Edge et al. | 455/434 |
| 2008/0071466 A1 | 3/2008 | Downs et al. | 701/117 |
| 2008/0085714 A1 | 4/2008 | Biby | 455/446 |
| 2009/0043486 A1 | 2/2009 | Yang et al. | 701/117 |
| 2009/0099760 A1 | 4/2009 | Lederman et al. | 701/118 |
| 2009/0227270 A1 * | 9/2009 | Naaman | 455/456.6 |
| 2009/0631203 | 12/2009 | Alizadeh-Shabdiz | 455/456.1 |
| 2010/0201576 A1 * | 8/2010 | Fujimoto | 342/464 |

FOREIGN PATENT DOCUMENTS

| | | |
|---|---|---|
| EP | 0865223 | 9/1998 |
| WO | WO 98-24251 | 6/1998 |
| WO | WO 2004-017660 | 2/2004 |

OTHER PUBLICATIONS

Printout from http://www.tomtom.com/page/iq-routes, 6 pages, published prior to Dec. 16, 2009.
Printout from http://news.thomasnet.com/fullstory/822322 5 pages, published prior to Dec. 16, 2009.
Printout from http://en.wikepedia.org/wiki/Coefficient_of_determination, 9 pages, published prior to Dec. 16, 2009.

(Continued)

*Primary Examiner* — Lester Kincaid
*Assistant Examiner* — Isaak R Jama
(74) *Attorney, Agent, or Firm* — Samuel M. Korte; Mohammad M. Ali

(57) ABSTRACT

A method and apparatus for collecting and analyzing cellular identification (ID) numbers at various geographic locations to estimate cellular tower locations. The method may include collecting cellular ID numbers obtained by collection mobile devices at a plurality of geographic locations then calculating minimum bounding circles encompassing a set of geographic location points with the same cellular identification numbers. If the cellular ID number of a set of location points indicates that the cellular tower is omni-directional, a center of the minimum bounding circle is an estimated cellular tower location. If the cellular ID number indicates that the cellular tower is multi-sector, the apparatus may calculate the estimated cellular tower location as the location at which lines that extend from the centers of a plurality of related minimum bounding circles intersect with each other to form equal angles.

22 Claims, 5 Drawing Sheets

OTHER PUBLICATIONS

Printout from http://en.wikepedia.org/wiki/Pearson_product-moment_correlation_coefficient, 11 pages, published prior to Dec. 16, 2009.
Zhang et al., "Parallel Implementing of Road Situation Modeling with Floating GPS Data", H.T. Shen et al. (Eds.): APWeb Workshops 2006, LNCS 3842, pp. 620-624; 2006.
Printout from http://www.google.com/mobile/gmm/mylocation/index.html 2 pages, published prior to Feb. 23, 2010.
Printout from http://www.pcworld.com/article/140080/google_service_uses_cell_towers_to_locate_users.html 2 pages, published prior to Feb. 23, 2010.
Printout from http://www.google.com/support/mobile/bin/answer.py?hl=en&answer=81873 2 pages, published prior to Feb. 23, 2010.
International Search Report from Corresponding International Application No. PCT/US2011/025837, dated Sep. 30, 2011.

* cited by examiner

METHOD AND APPARATUS FOR ESTIMATING CELLULAR TOWER LOCATION

BACKGROUND

Embodiments of the present invention relate to a method, apparatus, and computer program for estimating cellular tower locations using cellular identification numbers received at known locations.

Cellular tower location information may be used to estimate the location of non-GPS enabled devices or even GPS-enabled devices when GPS signal reception is poor. The estimated location may also be used to improve GPS fix time and other location-based services. However, it can be laborious and costly to survey the network to relate the network IDs with actual cellular tower locations.

SUMMARY

Embodiments of the present invention relate to a method, apparatus, and computer program for collecting and analyzing cellular identification (ID) numbers at various geographic locations to determine estimated cellular tower locations. The estimated cellular tower locations may be used by mobile devices to provide location estimation when GPS is not available and/or to facilitate GPS-based location determination. In one embodiment of the invention, the method may comprise collecting cellular ID numbers at various geographic locations, calculating minimum bounding circles encompassing a set of geographic location points with the same cellular ID numbers, and determining if the cellular ID numbers indicate that the cellular tower is omni-directional or multi-sector. If the cellular tower is omni-directional, the apparatus may determine that the location of a center of the minimum bounding circle is the estimated cellular tower location. If the cellular tower is multi-sector, the apparatus may determine that the estimated cellular tower location is at a location where lines that extend from the centers of a plurality of related minimum bounding circles intersect with each other to form equal angles.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 4:
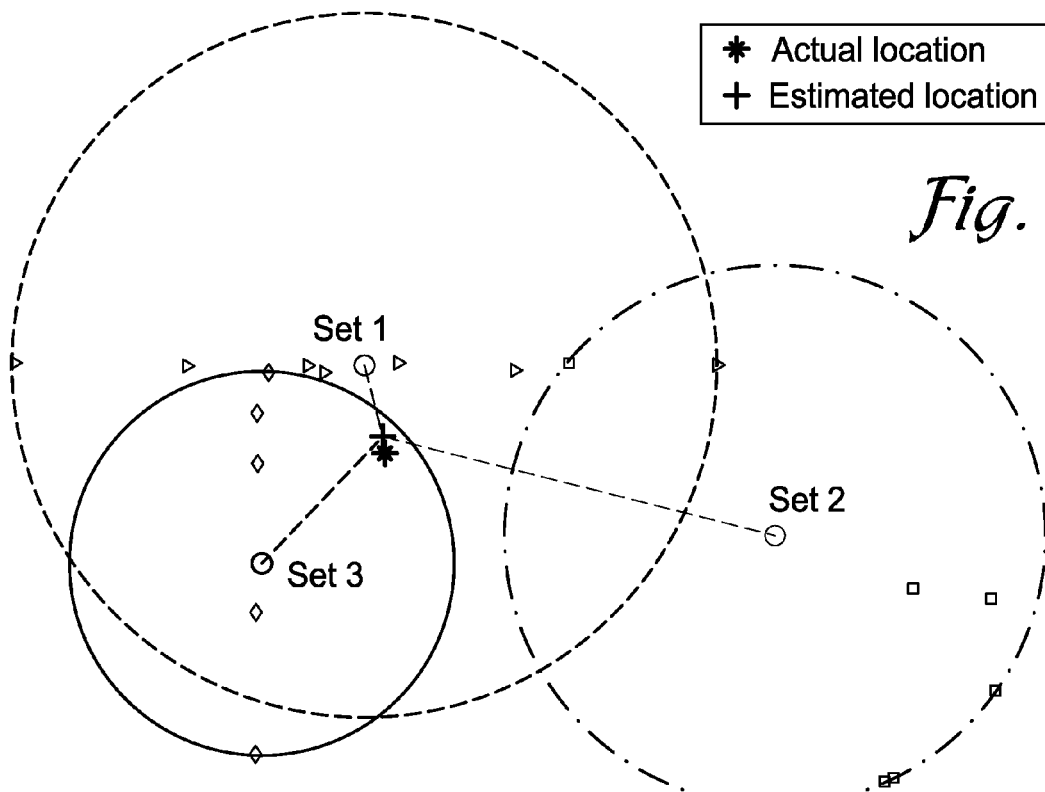
Figure 5:
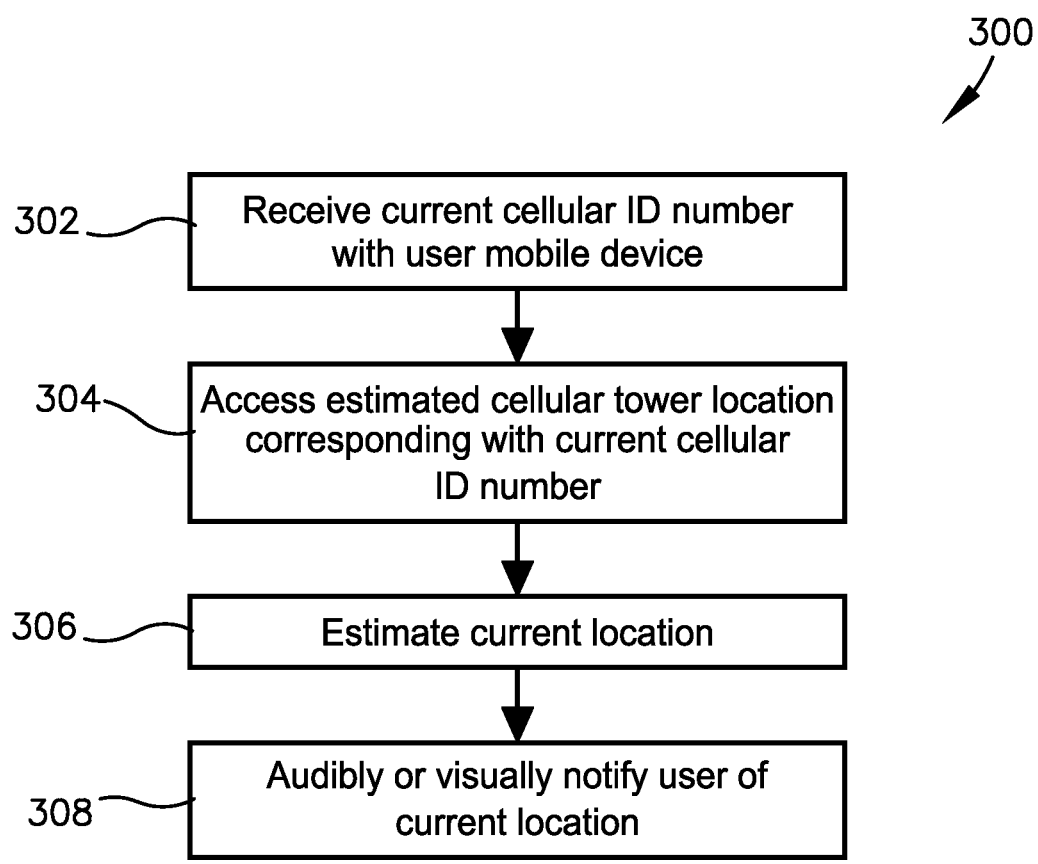
Figure 6:
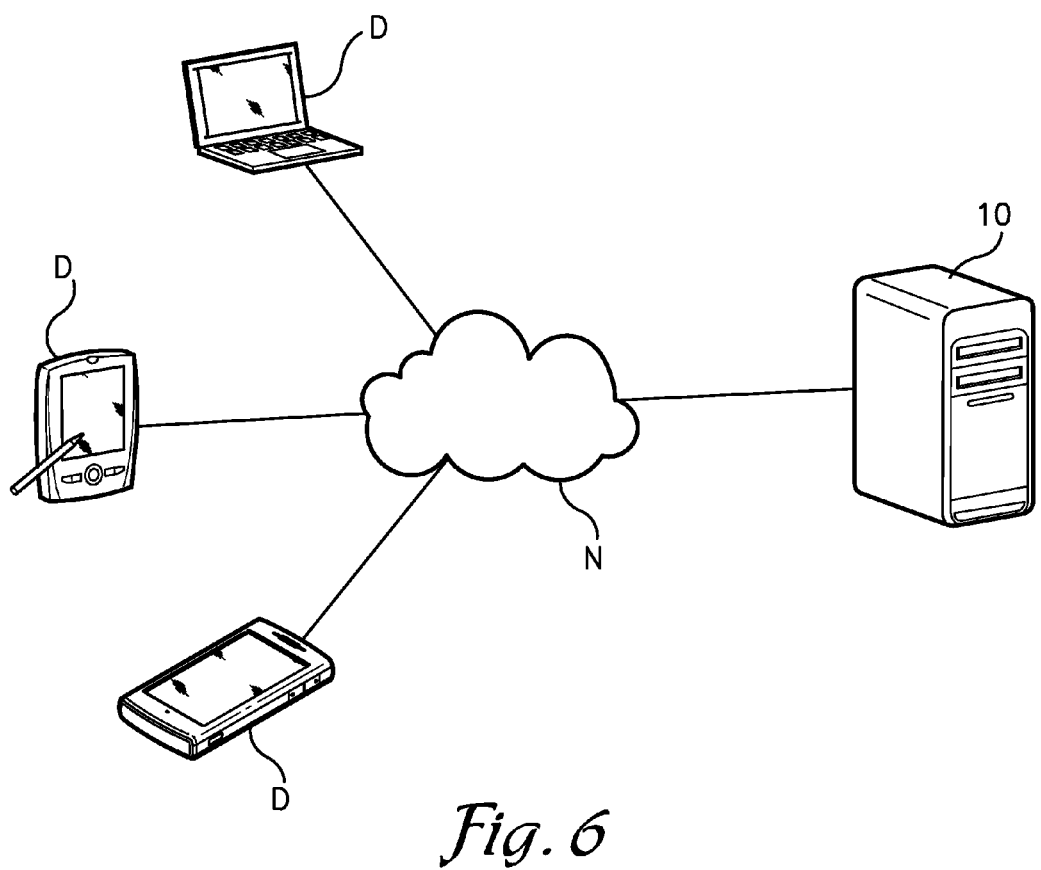

FIG. 4. is another example plot of location points and corresponding minimum bounding circles used in determining an estimated cellular tower location;

FIG. 5 is a flow chart of a method for using an estimated cellular tower location to estimate a current location of a user mobile device; and FIG. 6 is a block diagram illustrating an exemplary environment of embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

The present invention relates to a method, apparatus, and computer program for collecting and analyzing cellular identification (ID) numbers at various geographic locations to estimate cellular tower locations. A cellular tower, as referenced herein, may be a cell site, a cellular tower, a mobile phone mast, a base station, and/or a base station site, and the like. Each cellular tower may comprise antennas and electronic communications equipment placed on a radio mast, tower, or other elevated structure to create a cell in a cellular network. The electronic communications equipment may comprise one or more sets of transmitter/receivers transceivers, digital signal processors, control electronics, a GPS receiver for timing, regular and backup electrical power sources, and sheltering.

As illustrated in the overview of FIG. 6, the apparatus 10 described herein may collect cellular ID numbers and related geographic location information from collection mobile devices D or other sources and then calculate minimum bounding circles encompassing a set of geographic location points with the same cellular identification numbers. In some embodiments, the collection mobile devices D may transmit cellular ID numbers and related geographic location information to the apparatus 10 via one or more networks N, including a cellular data network, a Wi-Fi network, the Internet, and the like. If the cellular ID number of a set of location points indicates that a cellular tower is omni-directional, the apparatus 10 may store the location of a center of the minimum bounding circle in memory as an estimated cellular tower location. If the cellular ID number indicates that the cellular tower is multi-sector, the apparatus 10 may calculate the estimated cellular tower location at which lines that extend from the centers of a plurality of related minimum bounding circles intersect with each other to form equal angles. The apparatus and method described herein allow more precise estimates of cellular tower locations without requiring laborious and costly surveying of the network to relate the network IDs with actual cellular tower locations. The estimated cellular tower locations may then be used by mobile devices such as cell phones, personal navigation devices, the collection devices D, and the like to rapidly estimate current location.

Figure 1:
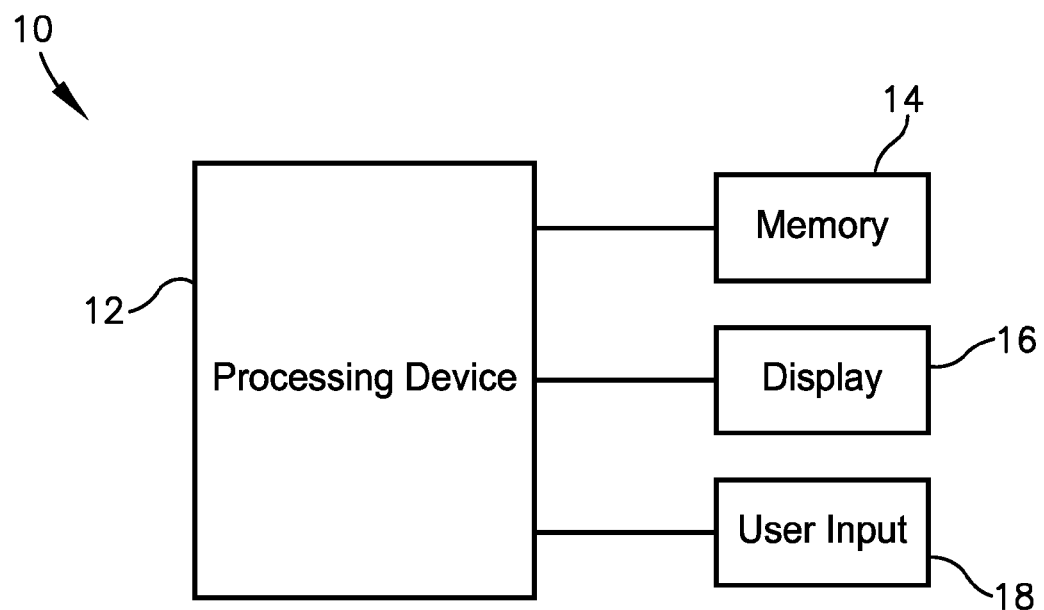
FIG. 1 is a schematic diagram of an apparatus constructed according to an embodiment of the present invention.

As illustrated in FIG. 1, the apparatus 10 for determining cellular tower locations may comprise a processing device 12, a memory element 14, a display 16, and a user interface 18. The processing device 12 may comprise any number and combination of processors, controllers, integrated circuits, programmable logic devices, or other data and signal processing devices for carrying out the functions described herein, and may additionally comprise one or more memory storage devices, transmitters, receivers, and/or communication busses for communicating with the various components of the apparatus 10.

In various embodiments, the processing device 12 may implement a computer program and/or code segments to perform some of the functions described herein. The computer program may comprise a listing of executable instructions for implementing logical functions in the processing device 12. The computer program can be embodied in any computer readable medium for use by or in connection with an instruction execution system, apparatus, or device, and execute the instructions. In the context of this application, a "computer readable medium" can be any means that can contain, store, communicate, propagate, or transport the program for use by or in connection with the instruction execution system, apparatus, or device. The computer readable medium can be, for example, but not limited to, an electronic, magnetic, optical, electro magnetic, infrared, or semi conductor system, apparatus, device or propagation medium. More specific, although not inclusive, examples of the computer readable medium would include the following: a portable computer diskette, a random access memory (RAM), a read only memory (ROM), an erasable, programmable, read only memory (EPROM or flash memory), and a portable compact disk read only memory (CDROM), combinations thereof, and the like.

The memory element 14 may be integral with the processing device 12, stand alone memory, or a combination of both. The memory element 14 may include, for example, removable and non removable memory elements such as RAM, ROM, flash, magnetic, optical, USB memory devices, and/or other memory elements. The memory element 14 may store geographic locations, estimated cellular tower locations, and data format standards for cellular identification (ID) numbers, as well as computer programs, code segments, and/or other data for instructing the processing device 12 to perform the functions and methods described herein. The memory element 14 may also be configured to be accessed by and/or integral with a user mobile device, as described below.

The display 16 may comprise a graphical interface operable to display visual graphics, images, text, etc. in response to external or internal processes and commands. For example, the display 16 may comprise conventional black and white, monochrome, or color display elements including CRT, TFT, LCD, and/or LED display devices. The display 16 may be integrated with the user interface 18, such as in embodiments where the display 16 is a touch screen display to enable the user to interact with it by touching or pointing at display areas to provide information to the apparatus 10. The display 16 may be coupled with the processing device 12 and may be operable to display various information corresponding to the apparatus 10, such as cellular tower information.

The user interface 18 enables one or more users to share information with the apparatus 10, such as data format standards, collected cellular ID numbers and the locations at which the ID numbers were collected. The user interface 18 may comprise one or more functionable inputs such as buttons, switches, scroll wheels, a touch screen associated with the display 16, voice recognition elements such as a microphone, pointing devices such as mice, touchpads, tracking balls, styluses, a camera such as a digital or film still or video camera, combinations thereof, etc. Further, the user interface 18 may comprise wired or wireless data transfer elements such as a removable memory, data transceivers, a transmitter, and the like, to enable the user and other devices or parties to remotely interface with the apparatus 10. For example, the user interface 18 may comprise a transmitter for sending and receiving cellular tower location information and location-related information to and from a user mobile device. The user interface 18 may also include a speaker for providing audible instructions and feedback.

The apparatus 10 may be communicably coupled with various collection mobile devices, including the user mobile devices discussed herein. A collection mobile device may be one or more cellular phones or other connected devices comprising at least one antenna with GPS and/or cellular capabilities. Each collection mobile device may be configured to locally store and/or transmit data regarding its current and/or previously-traversed geographic location and the cellular ID number of any cellular signals received by the antenna of the device at that geographic location. The collection mobile devices may comprise any combination of hardware and software required for wirelessly sending and receiving the cellular ID numbers and current locations of the collection mobile devices. The geographic locations and corresponding cellular ID numbers obtained by the collection mobile devices may be uploaded into a database accessible to the apparatus 10, wirelessly transmitted to the apparatus 10 via cellular networks, data networks, and the like, or otherwise input into the apparatus 10, such as by a user via the user interface 18.

Cellular network providers, navigation providers, map providers, internet search providers, and the like may operate and maintain the apparatus 10 and may output estimates of cell tower locations to various mobile communication devices, such as the collection mobile devices described above and/or various databases accessible by various mobile devices and/or users.

The above-described apparatus 10 may be used to implement a method of collecting and analyzing cellular ID numbers to determine the location of a cellular tower. The method may involve collecting cellular ID numbers from mobile devices at various geographic locations, grouping location points into sets according to their cellular ID numbers, and determining a minimum bounding circle for each set. Then an estimated cellular tower location is calculated as either the center of the minimum bounding circle or a location point at which lines extending from the center of each related minimum bounding circle meet at equal angles.

Figure 2:
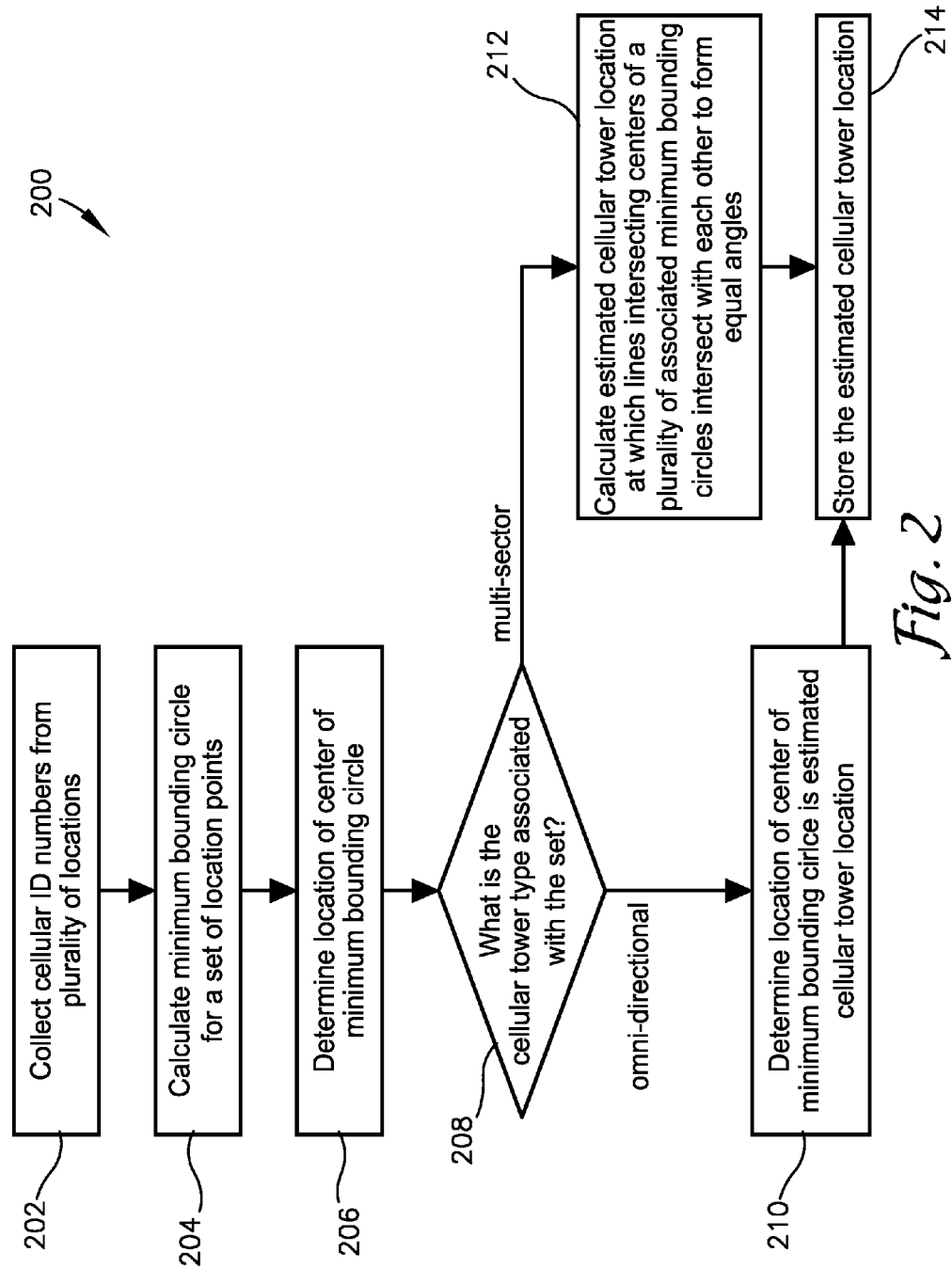
FIG. 2 is a flow chart of a method for estimating a cellular tower location according to an embodiment of the present invention.

The flow chart of FIG. 2 depicts the steps of an exemplary method of the invention in more detail. In this regard, some of the blocks of the flow chart may represent a module segment or portion of code of the computer programs stored in or accessible by the processor. In some alternative implementations, the functions noted in the various blocks may occur out of the order depicted in FIG. 2. For example, two blocks shown in succession in FIG. 2 may in fact be executed substantially concurrently, or the blocks may sometimes be executed in the reverse order depending upon the functionality involved.

As illustrated in FIG. 2, a method 200 of the present invention may comprise collecting cellular identification (ID) numbers from the collection mobile devices at a plurality of geographic locations (as depicted in step 202) and calculating minimum bounding circles that each encompass a set of the geographic locations having identical cellular identification numbers (as depicted in step 204). Furthermore, the method 200 may comprise determining a location of a center of the minimum bounding circles (as depicted in step 206) and determining if the cellular ID numbers indicate an omni-directional cellular tower or a multi-sector cellular tower (as depicted in step 208).

If the cellular ID number indicates that the cellular tower is omni-directional, it may be determined that the location of the center of the minimum bounding circle is the estimated cellular tower location (as depicted in step 210). However, if the cellular ID number indicates that the cellular tower is multi-sector, the estimated cellular tower location at which lines extending from the centers of a plurality of related minimum bounding circles intersect with each other to form equal angles may be calculated (as depicted in step 212). Once the estimated cellular tower location is determined using step 210 or 212, the estimated cellular tower location may be stored in the memory element (as depicted in step 214).

Collecting cellular ID numbers from the collection mobile devices at a plurality of geographic locations, as depicted in step 202, may comprise manual input or wireless input of location points and associated cellular ID numbers, as well as signal strengths of the cellular signal at the location points. As described above, the collection mobile devices, for example, may be cellular phones or other connected devices with GPS functionality configured to locally store and/or transmit data regarding its current and/or previously-traversed geographic location and the cellular ID number of any cellular signals received by the phone's antenna at that geographic location. For example, as a GPS-enabled cellular phone moves about, it may periodically log its location and the cellular ID number detected by the phone's receiver at each location. The cellular phone may upload its log to the apparatus 10 in real-time, in periodic intervals, or when instructed to do so by its user. However, the cellular ID numbers may be collected from any source and need not be collected directly from the collection mobile devices. For example, embodiments of the present invention may employ pre-existing cellular ID number databases that were assembled by third parties through various methods.

The cellular ID number is an identification number unique to each cellular tower and/or cellular tower sector and is provided via signals from the cellular tower to each antenna and device with which it communicates. The collected location points and their cellular ID numbers may be stored in the memory element 14. These collected location points and their cellular ID numbers may be input into the memory element 14 from the collection mobile devices directly via the user interface 18, transmitted to the apparatus 10 wirelessly, and/or uploaded into a database that is accessible by the apparatus 10.

Calculating the minimum bounding circles, as depicted in step 204, may comprise grouping collected location points having the same cellular ID number into sets and then calculating minimum bounding circles for each set of the location points. Each of the bounding circles should intersect and/or encompass each of the location points of one of the sets, with the bounding circle intersecting at least two location points of the set. For example, the minimum bounding circle may be a circle with a minimum radius that contains all of the location points with the same cellular ID number. The step of calculating the minimum bounding circles may be performed by the processing device 12.

The following is an example pseudo-code for implementing step 204 of the method 200 described above. The step 204 of calculating one or more minimum bounding circles may include the following:

---

Find exterior location points in a set of location points having the same cellular ID number using algorithms such as the convex hull algorithm;
Pick 3 points from the exterior points to find group 1 and the remaining points are group 2;
Done = false;
While Not(Done),
    Calculate the circle that is defined by the 3 points of group 1
    If all points from group 2 are in the circle,
        Done = true;
    Else,
        Find the point F from group 2 that is the most far away from the circle and pick 2 points from group 1 to form the new group 1 such that the 3rd point is inside the circle formed by F and the other 2 points.
    Put the 3rd point into group 2.

---

Next, determining the location of the center of the minimum bounding circles may be calculated by the processing device 12, as in step 206. Then, the cellular ID numbers corresponding with each set may be analyzed to determine if they indicate an omni-directional cellular tower or a multi-sector cellular tower, as depicted in step 208. To determine the type or configuration of the cellular tower, particular digits, sequences, amount of digits, and the like of the cellular ID number may be analyzed. For example, particular data format standards may be published by various agencies, and based on those published standards, it may be determined the convention used by cellular carriers to represent cellular sector locations. In one embodiment, the cellular sector location may be encoded as the last digit of the cellular ID reported by the mobile device. However, cellular ID number schemes may vary from one carrier to another, so the processing device 12 may also analyze the cellular ID number to determine to which carrier the cellular tower belongs.

In some embodiments, gradient analysis of the cellular signals received by the collection mobile devices may be used to help determine if the cellular tower is multi-sector. For example, for each set, a direction vector of signal strength may be derived from the difference in signal strength at the set's various location points. If multiple sets have direction vectors pointing to the same general location, then it may be assumed that each originated from the same cellular tower and that the cellular tower is a multi-sector cellular tower.

If the cellular ID number indicates that the cellular tower is omni-directional, the location of the center of the minimum bounding circle may be the estimated cellular tower location, as depicted in step 210. As in step 214, the estimated cellular tower location may then be stored in the memory element 14. Alternatively or additionally, the estimated cellular tower location may be saved to another memory element that is not integral with the apparatus 10.

Calculating the estimated location of a multi-sector cellular tower, as depicted in step 212, may comprise determining which minimum bounding circles are related based on the cellular identification numbers of the set of geographic locations bounded by each circle. For example, the processing device 12 may associate multiple bounding circles with each other if the cellular ID numbers of location points bounded by each of the related minimum bounding circles are determined to correspond with each other and/or a single multi-sector cellular tower.

The calculating step 212 may also comprise calculating a point at which lines extending from the centers of the related minimum bounding circles will intersect with each other to form equal angles. For example, there may be three related minimum bounding circles and lines extending from the centers of the related minimum bounding circles may intersect to form 120 degree angles at the estimated cellular tower location. In another example, there may be four related minimum bounding circles and lines extending from the centers of the related minimum bounding circles may intersect to form 90 degree angles at the estimated cellular tower location. Thus, 360 may be divided by the number of sectors to determine the equal angles for a given tower. The geographic location of the point at which the lines intersect may be stored as the estimated cellular tower location in the memory element 14, as depicted in step 214.

The step 212 of calculating a point at which lines extending from the centers of the related minimum bounding circles will intersect with each other to form equal angles may include the following pseudo-code steps (using centers A, B, C of related minimum bounding circles for 3 sectors):

Find the circle C1 that is determined by A and B where arc(AB)=240 degrees;
Find the circle C2 that is determined by B and C where arc(BC)=240 degrees;
Find the two intersection points of C1 and C2;
The point that is not B is output as the estimated cellular tower location.

Finding the circle C1 may include finding the circles that are determined by points A and B such that the circle is divided by points A and B into two arcs, where the shorter arc(AB) is 120 degrees and the longer arc(AB) is 240 degrees. Two such circles exist. The circle C1 where the shorter arc (AB) is at the same side of line(AB) as point C may be selected so that, for any point X on the shorter arc(AB) of C1, the angle(AXB) is 120 degrees.

Finding the circle C2 may include finding the circles that are determined by points B and C such that the circle is divided by points B and C into 2 arcs where the shorter arc(BC) is 120 degrees and the longer arc(BC) is 240 degrees. Two such circles exist. The circle C2 where the shorter arc (BC) is at the same side of line(BC) as point A may be selected so that, for any point Y on the shorter arc(BC) of C2, the angle(BYC) is 120 degrees.

Figure 3:
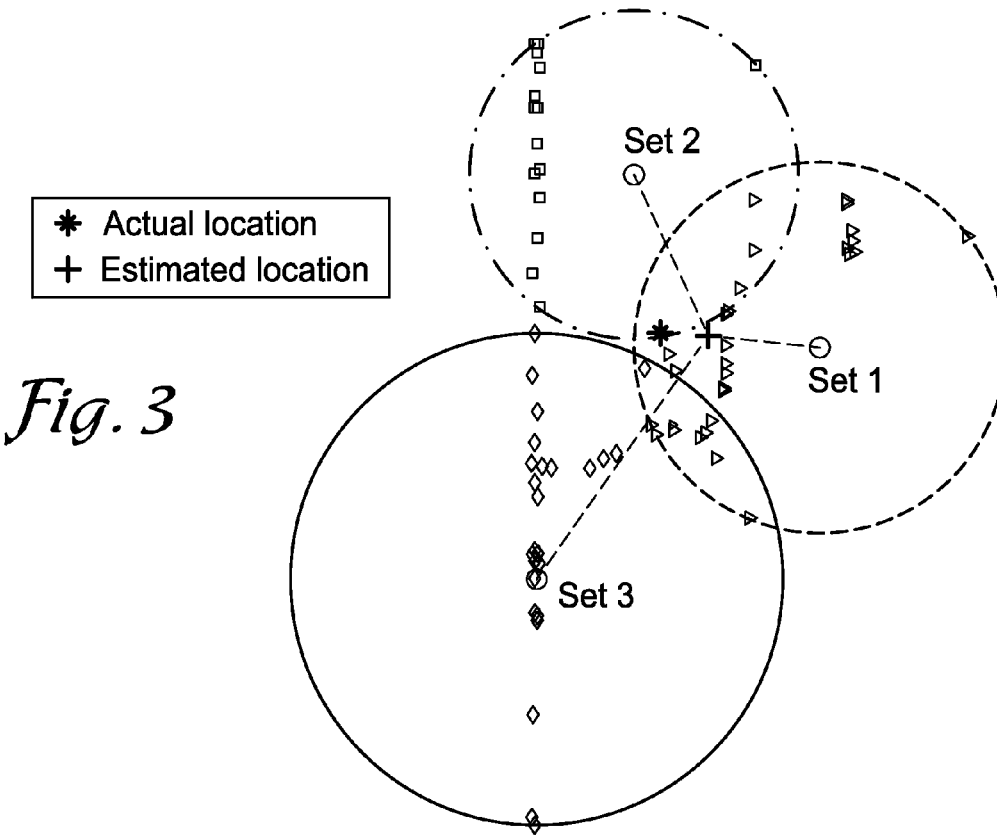
FIG. 3 is an example plot of location points and corresponding minimum bounding circles used in determining an estimated cellular tower location.

FIGS. 3-4 illustrate examples of plotted minimum bounding circles and the lines extending from the centers of the minimum bounding circles and intersecting each other to form equal angles. In FIG. 3, the triangles denote the locations where signals from sector 1 are received. The minimum bounding circle of sector 1 is drawn in dashed line and its center is marked as a small circle with the label "Set 1". Similarly, the squares denote locations where signals from sector 2 are received and the center of their minimum bounding circle is labeled "Set 2". The diamonds denote locations where signals from sector 3 are received and the center of their minimum bounding circle is labeled "Set 3". Applying the method described above, the estimated cellular tower location is found and denoted as "+" in FIG. 3. FIG. 4 shows a similar example from another cell tower. The actual location of the cell tower is denoted by an asterisk in FIGS. 3-4.

In FIGS. 3-4, the cellular tower is determined to have three sectors and equal 120 degree angles are formed by the lines extending from the centers of the minimum bounding circles. However, multi-sector cellular towers may have any number of sectors. For example, if there are four sectors, equal 90 degree angles may be formed by the lines extending from the centers of the four minimum bounding circles. In the examples of FIG. 3, the error between the real tower location and the estimated location is approximately 171.3 meters, while in the example of FIG. 4, the error is approximately 31.6 meters. The error may depend on a variety of factors, such as the number of collected samples or location points and the distribution of the collected samples or location points.

In use, the memory element 14 may be accessed by and/or integral with a user mobile device. The user mobile device, for example, may be one or more cellular phones, portable computers, or PDAs and the like, with or without GPS functionality. A method 300, illustrated in FIG. 5, of using the estimated cellular tower locations may comprise receiving with a user mobile device a current cellular identification number or a plurality of cellular identification numbers in range of the user mobile device (as depicted in step 302) and accessing with the user mobile device the estimated cellular tower location(s) associated in the memory element 14 with the current cellular identification number(s) (as depicted in step 304). Note that multiple cellular tower locations may be used by the user mobile device to calculate a user's location with greater accuracy.

In some embodiments of the invention, the apparatus 10 may transmit data representative of the estimated cellular tower location from its memory element 14 to the user mobile device. The estimated cellular tower location(s) may be used by the user mobile device and/or the apparatus 10 to estimate a current location of the user mobile device (as depicted in step 306). In various embodiments of the invention, the transmitter of the apparatus 10 may transmit the estimated current location of the user mobile device to the user mobile device based on the current cellular identification number transmitted from the user mobile device to the apparatus 10, without requiring the user mobile device to perform a cellular identification number lookup. Additionally, distance related measurements such as signal strength, timing advance, and the like may also be received or determined by the apparatus 10 and/or the user mobile device and used to determine location. For example, the user mobile device may request from the apparatus 10 the cell tower locations of all the cellular identification numbers that it is "seeing" and use all the received location information to determine its own location (e.g., via triangulation). The user mobile device may use cell tower locations and other distance-related measurements, such as signal strength and/or timing advance, to further assistant in determining its location. Further, the information provided to the apparatus 10 may include the distance-related measurements that may be used in combination with the estimated cellular tower locations to calculate a user mobile device location with greater accuracy.

The user mobile device may use the estimated cellular tower location (or the area surrounding the cellular tower location) as its own location until more precise location information is available. For many location-based services, a generalized location corresponding to the estimated cellular tower location may be sufficient even if GPS is not available. For example, a search for the nearest hospital is likely to return the same results regardless of the precision of the estimated cellular tower location. In some embodiments, the estimated current location of the user mobile device may also be used to facilitate GPS-based location determination, such as by assisting in the selection of pertinent ephemeris data. A user may then be audibly or visually notified of the current location via the user mobile device (as depicted in step 308). For example, the user mobile device may display a point on a map representative of the current location.

Although the invention has been described with reference to the preferred embodiment illustrated in the attached drawing figures, it is noted that equivalents may be employed and substitutions made herein without departing from the scope of the invention as recited in the claims. For example, in some embodiments of the invention, the apparatus 10 may be a separate device for providing information to and/or receiving information from various mobile devices. However, in other embodiments of the invention, the apparatus 10 may be one or more mobile devices configured to perform any plurality of the method steps described above.

Having thus described the preferred embodiment of the invention, what is claimed as new and desired to be protected by Letters Patent includes the following:

1. A method of estimating a location of a cellular tower, the method comprising:
    collecting with a processing device one or more cellular identification numbers associated with a plurality of geographic locations, wherein the geographic locations are current or previously-traversed locations of a user mobile device;
    determining with the processing device if the cellular identification numbers indicate an omni-directional cellular tower or a multi-sector cellular tower; and
    calculating with the processing device an estimated location of the cellular tower based on whether the cellular tower is omni-directional or multi-sector.

2. The method of claim 1, further comprising transmitting data representative of the estimated cellular tower location to the user mobile device.

3. The method of claim 2, further comprising the step of receiving one or more current cellular identification numbers corresponding to the user mobile device; estimating a current location of the user mobile device by accessing the estimated cellular tower location associated with the one or more current cellular identification numbers; and transmitting the estimated current location of the user mobile device to the user mobile device.

4. The method of claim 1, wherein the estimated location is determined by a first method if the cellular tower is omni-directional and is determined by a second method if the cellular tower is multi-sector.

5. The method of claim 4, wherein the first and second methods comprise: calculating with the processing device at least one minimum bounding circle encompassing or intersecting each location point of a set of the geographic locations having the same cellular identification numbers; and determining a location of a center of the minimum bounding circle for each of the sets with the processing device.

6. The method of claim 5 wherein the first method further comprises: determining the location of the center of the minimum bounding circle is the estimated cellular tower location with the processing device.

7. The method of claim 5, wherein the second method comprises: calculating with the processing device the estimated cellular tower location as a geographic location at which lines extending from the centers of a plurality of related minimum bounding circles intersect to form equal angles.

8. The method of claim 7, further comprising determining which minimum bounding circles are related minimum bounding circles using the processing device based on at least one of the cellular identification numbers of the sets and signal strength direction vectors calculated for each set.

9. A computer program embodied on a non-transitory computer-readable medium for estimating a location of a cellular tower, the computer program comprising:
    a code segment for collecting one or more cellular identification numbers associated with a plurality of geographic locations, wherein the geographic locations are current or previously-traversed locations of a user mobile device;
    a code segment for determining if the cellular identification numbers indicate an omni-directional cellular tower or a multi-sector cellular tower; and
    a code segment for calculating an estimated location of the cellular tower based on whether the cellular tower is omni-directional or multi-sector.

10. The computer program of claim 9, further comprising a code segment for transmitting data representative of the estimated cellular tower location to the user mobile device.

11. The computer program of claim 10, further comprising a code segment for receiving a current cellular identification number corresponding to the user mobile device; a code segment for estimating a current location of the user mobile device by accessing the estimated cellular tower location associated with the current cellular identification number; and a code segment for outputting the current location to the user mobile device.

12. The computer program of claim 9, further comprising a code segment for executing a first method to calculate the estimated location if the cellular tower is omni-directional and executing a second method to calculate the estimated location if the cellular tower is multi-sector.

13. The computer program of claim 12, wherein the first and second methods comprise: a code segment for calculating at least one minimum bounding circle encompassing or intersecting each location point of a set of the geographic locations having the same cellular identification numbers; and a code segment for determining a location of a center of the minimum bounding circle for each of the sets.

14. The computer program of claim 13, wherein the first method further comprises: a code segment for determining the location of the center of the minimum bounding circle is the estimated cellular tower location.

15. The computer program of claim 13, wherein the second method comprises: a code segment for calculating the estimated cellular tower location as a geographic location at which lines extending from the centers of a plurality of related minimum bounding circles intersect to form equal angles.

16. The computer program of claim 15, further comprising a code segment for determining which minimum bounding circles are related minimum bounding circles based on at least one of the cellular identification numbers of the sets and signal strength direction vectors calculated for each set.

17. An apparatus configured for estimating a location of a cellular tower, the apparatus comprising:
    a memory element; and
    a processing device communicably coupled with the memory element and configured to:
        collect one or more cellular identification numbers associated with a plurality of geographic locations, wherein the geographic locations are current or previously-traversed locations of a user mobile device;
        determine if the cellular identification numbers indicate an omni-directional cellular tower or a multi-sector cellular tower; and
        calculate an estimated location of the cellular tower based on whether the cellular tower is omni-directional or multi-sector.

18. The apparatus of claim 17, wherein the processing device is further configured to use a first set of algorithms to calculate the estimated location if the cellular tower is omni-directional and to use a second set of algorithms to calculate the estimated location if the cellular tower is multi-sector.

19. The apparatus of claim 18,
    wherein the processing device is further configured to calculate at least one minimum bounding circle encompassing or intersecting each location point of a set of the geographic locations having the same cellular identification numbers and determine a location of a center of the minimum bounding circle for each of the sets, wherein the processing device is configured to execute the first set of algorithms to determine the location of the center of the minimum bounding circle as the estimated cellular tower location, wherein the processing device is configured to execute the second set of algorithms to calculate the estimated cellular tower location as a geographic location at which lines extending from the centers of a plurality of related minimum bounding circles intersect to form equal angles.

20. The apparatus of claim 19, further comprising a transmitter configured for transmitting data representative of the estimated cellular tower location to a user mobile device.

21. The apparatus of claim 20, wherein the processing device is further configured for receiving one or more current cellular identification numbers corresponding to the user mobile device; estimating a current location of the user mobile device by accessing the estimated cellular tower location associated with the one or more current cellular identification numbers; and outputting the current location to the user mobile device.

22. The apparatus of claim 19, wherein the apparatus is further configured for determining which minimum bounding circles are related minimum bounding circles based on at least one of the cellular identification numbers of the sets and signal strength direction vectors calculated for each set.

* * * * *